US007574272B2

(12) United States Patent
Gibbs et al.

(10) Patent No.: US 7,574,272 B2
(45) Date of Patent: Aug. 11, 2009

(54) SYSTEM AND METHOD FOR DATA TRANSFER OPTIMIZATION IN A PORTABLE AUDIO DEVICE

(76) Inventors: Eric Paul Gibbs, 2918 NW. Esplanade St., Seattle, WA (US) 98117; Mark Edward Phillips, 3028 22$^{nd}$ Ave., West, Seattle, WA (US) 98119

( * ) Notice: Subject to any disclaimer, the term of this patent is extended or adjusted under 35 U.S.C. 154(b) by 1333 days.

(21) Appl. No.: 09/975,749

(22) Filed: Oct. 10, 2001

(65) Prior Publication Data
US 2002/0045961 A1   Apr. 18, 2002

Related U.S. Application Data

(60) Provisional application No. 60/240,776, filed on Oct. 13, 2000.

(51) Int. Cl.
*G06F 17/00* (2006.01)
(52) U.S. Cl. ....................................................... 700/94
(58) Field of Classification Search .................... 700/94
See application file for complete search history.

(56) References Cited

U.S. PATENT DOCUMENTS 5,477,511 A * 12/1995 Englehardt ............... 369/25.01
5,720,037 A * 2/1998 Biliris et al. ................... 725/92
6,332,175 B1 * 12/2001 Birrell et al. .................. 711/112
6,378,035 B1 * 4/2002 Parry et al. ................... 711/110
6,791,481 B2 * 9/2004 Altare et al. ................... 341/55

OTHER PUBLICATIONS

GNU.org, Unix Man pp. dd (1), Nov. 1998, http://www.rt.com/man/dd.1.html.*
Compaq's System Research Center, Personal Jukebox, unknown date, http://research.compaq.com/SRC/pjb.*
HanGo Electronics, Personal Jukebox, Feb. 29, 2000, http://web.archive.org/web/20000229023013/www.pjbox.com/product.htm.*
Compaq's System Research Center, Personal Jukebox, google cache date is Dec. 14, 2005, http://research.compaq.com/SRC/pjb.*

* cited by examiner

*Primary Examiner*—Daniel R. Sellers
(74) *Attorney, Agent, or Firm*—Bob Bergstrom; Mike Donahue (57) ABSTRACT

A system and method are disclosed wherein a battery-powered portable audio device utilizes a spinning media device for data storage. To conserve batter power, the motor in the media storage device is not powered unless an actual data transfer is required. A processor calculates the amount of data remaining in a data buffer and considers a number of factors, such as the type of spinning media storage device, amount of available buffer space, the type of CODEC used to implement the system, and the type of data to determine when it will be necessary to power up the spinning media storage device and transfer data to assure that a continuous stream of data is provided to the CODEC.

10 Claims, 7 Drawing Sheets

SYSTEM AND METHOD FOR DATA TRANSFER OPTIMIZATION IN A PORTABLE AUDIO DEVICE

CROSS-REFERENCE TO RELATED APPLICATION

This application claims the benefit of U.S. Provisional Patent Application No. 60/240,776 filed Oct. 13, 2000, where this provisional application is incorporated herein by reference in its entirety.

TECHNICAL FIELD

The present invention relates generally to portable audio devices and, more particularly, to a system and method for optimizing data transfer from a spinning media in a portable audio device.

BACKGROUND OF THE INVENTION

Portable devices have evolved from large cumbersome analog tape players to highly miniaturized digital storage devices. Early portable audio devices were typically in the form of analog tape players. Early tape players were large devices that required significant battery power for satisfactory operation. Analog tape players, such as the SONY Walkman™, provided a relatively compact device that played a standard audio cassette, required multiple batteries because of the power consumption required to drive the motor. Although these were popular devices, their large size and weight were a significant drawback. Similarly, portable disk players, capable of playing a compact disk (CD) were large and bulky. Portable CD players are also susceptible to vibration and require significant circuitry to avoid skipping.

More recently, portable digital devices have been designed to eliminate all moving parts. These devices incorporate solid state memory storage technology and utilize digital processing capabilities, such as data compression, to minimize the storage requirements. A popular music format, known as Motion Pictures Expert Group layer 3 (MPEG-1 layer 3) defines a digital music format that plays "near-CD quality" music from a relatively small digital file as compared to the original digital file stored on a CD. Indeed, a music data file using the data structure defined by MPEG-2 layer 3, sometimes abbreviated as MP3, is approximately one-tenth the size of a comparable data file on a CD. In addition, the solid state storage used in a typical MP3 player does not include a CD and thus is not susceptible to skipping. Furthermore, the solid state format of MP3 does not include a tape, such as required by a cassette player, and thus does not destroy the data storage device by "eating" the tape.

Despite these improvements, MP3 players have limited solid state storage capacity. Several different types of memory devices, such as flash memory, smart media, MMC, and the like, are used to provide storage. Other types of spinning media devices, such as hard disk drives and micro-drives, may be used to provide additional storage capacity for an MP3 player. However, the motor associated with such spinning media consumes a significant amount of power. This is a significant problem in a battery operated portable device. Accordingly, it can be appreciated that there is a significant need for a system and method for optimizing data transfer from a spinning media storage device. The present invention provides this and other advantages, as will be apparent from the following detailed description and accompanying figures.

DETAILED DESCRIPTION OF THE INVENTION

The present invention provides a technique for transferring data from a spinning storage media, such as a disk drive or micro-drive, in a portable audio device. As is known in the art, these portable devices are battery powered. The drive motors associated with spinning media storage devices consume significant amounts of electrical power from a limited capacity battery power supply. To conserve power, the present invention only periodically applies electrical power to the spinning media storage device. Because the storage device is only powered when a data transfer is required, the system must calculate when a transfer is required, activate the storage device motor, wait until the motor comes to the proper speed, and read an optimal amount of data from the spinning media into a storage buffer. As will be discussed in greater detail below, the quantity of data transferred each time the storage media motor is activated may vary from one disk transfer to the next so as to optimize the actual data transfer.

Figure 1:
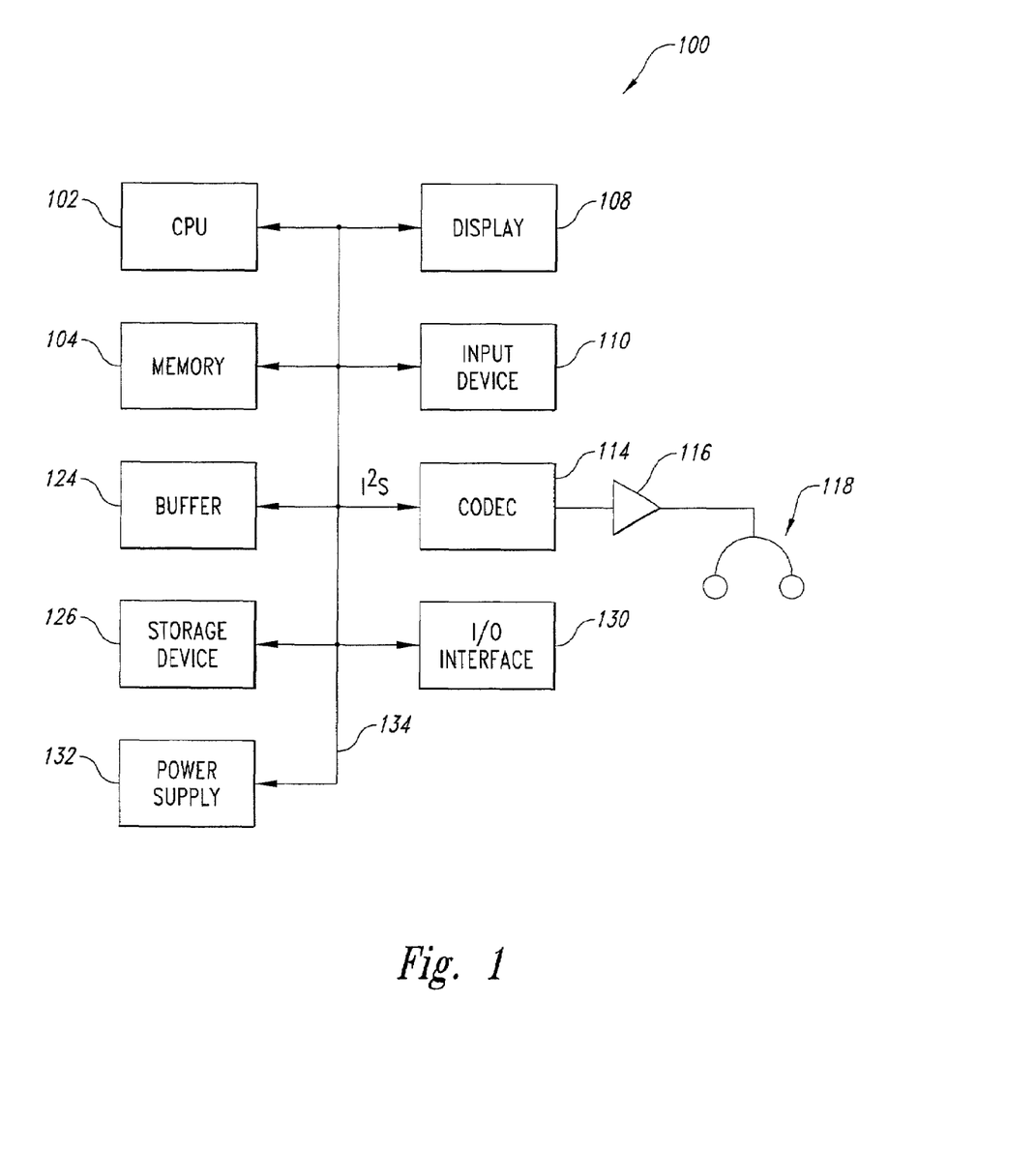
FIG. 1 is a functional block diagram of an example embodiment of the present invention.

The present invention is embodied in a system 100, illustrated in the functional block diagram of FIG. 1. The system 100 includes a central processing unit (CPU) 102 and a memory 104. The CPU 102 may be implemented using a device, such as the ARM 7209 from Cirrus Logic or other processor designed for operation as an MP3 player. However, those skilled in the art will appreciate that the CPU 102 may be implemented using any convenient processor, such as a microprocessor, embedded controller, digital signal processor (DSP) or the like. The present invention is not limited by the specific form of the CPU 102. The memory 104 may typically include both random access memory (RAM) and read-only memory (ROM). In one embodiment, the ROM portion of the memory 104 may be implemented using a flash program memory or a NAND flash memory. In addition, the memory 104 includes a basic input output system (BIOS), which contains instructions that allow the CPU 102 to communicate with various peripheral devices.

In addition, the system 100 includes a display 108. In an exemplary embodiment, the display 108 is implemented as a liquid crystal display (LCD) to reduce overall power consumption. In one example, the display 108 may be a 240 by 160 pixel LCD subsystem, such as may be commercially purchased from a number of vendors. The display 108 may conveniently provide instructions to the user as well as programmable functions that may be context-sensitive. For example, when playing a music signal, the display 108 may provide commands associated with music playing, song information, and the like. For example, the display 108 may show the sampling rate and number of kilobytes in a particular data file. The display 108 may also include other information, such as power status, startup information, and the like.

The system 100 also includes an input device 110. The input device 110 may be implemented as a series of electromechanical switches using conventional techniques. Alternatively, the input device 110 may be implemented in conjunction with the display 108 to provide a touch-sensitive display. A touch-sensitive display advantageously minimizes the need for electromechanical switches and further provides labels on the display that may be readily altered to accommodate variations in the implementation of the system 100. Alternatively, the input device 110 may comprise both electromechanical switches and a touch-sensitive display. Electromechanical switches and touch-sensitive displays are known in the art and need not be described in further detail herein. However, the present invention is not limited by the specific form of the input device 110.

As those skilled in the art can appreciate, the data representing the audio signal is in the form of digital samples. The digital data must be converted to analog form to produce a useful signal for the user. The system 100 includes a coder/decoder (CODEC) 114. The CODEC 114 is also sometimes referred to as a "compressor/decompressor" because the digital data samples are usually stored in a compressed form and are decompressed for playback. The CODEC 114 accepts a digital data stream and converts it to a representative analog signal. Different commercial CODECs are available for audio applications. Some CODECs, such as a code excited linear prediction (CELP) CODEC is designed for operations at relatively low frequencies and thus is particularly useful as a speech CODEC. Other forms of speech CODECs include adaptive delta modulation (ADM), pulse code modulation (PCM) and adaptive differential pulse code modulation (AD-PCM). Other forms of CODECs are designed for operation at higher frequencies and thus are useful for music applications. These music CODECs include MPEG or MP3 CODECs, G2 format, developed by Real Networks, Enhanced Perception Audio Coder (ePAC), developed by Lucent, AC3 algorithm, which is a modified version of PCM, and Windows Media Audio (WMA), developed by the Microsoft Corporation. Some formats, such as the G2 format, may be used for both music and voice. Although the examples illustrated herein are directed to MP3 music format, those skilled in the art will recognize that the CODEC 114 illustrated in FIG. 1 may be satisfactorily implemented using any of the known CODEC technologies for either speech applications, music applications, or both. Thus, the present invention is not limited by the specific implementation of the CODEC 114.

In an MP3 environment, the digital data is provided to the CODEC 114 using an $I^2S$ bus. The $I^2S$ bus is a high speed serial bus that is well known to those of ordinary skill in the art. As such, implementation details of the $I^2S$ bus need not be provided herein. The CODEC 114 receives the data on the $I^2S$ bus and converts it from digital data form to analog data. An analog amplifier 116 has an input terminal coupled to the output of the CODEC and receives the analog signal thereon. The amplifier 116 provides the necessary amplification and drive capability to power an audio output device 118, such as a pair of headphones. It should be noted that in a typical implementation, the output of the amplifier 116 is coupled to a standard ⅛ inch phone jack 172 (see FIG. 2). The headphones 118 plug into the phone jack 172.

The system 100 also includes a buffer 124 that receives and temporarily stores digital data and provides the digital data to the CODEC 114. As will be discussed below, the buffer 124 receives data from a storage device 126. The buffer 124 may be a stand-alone device, or may be a portion of the memory 104. The use of the buffer 124 in optimizing the response of the storage device 126 will be discussed below.

The storage device 126 is typically implemented as a spinning media device, such as a micro-drive, click drive, IDE drive, CD-ROMs, or the like. As will be discussed in detail below, the storage device 126 has a controllable motor that is only enabled when the system 100 requires a data transfer from the storage media. The optimization of the storage device 126 includes a determination of when to start the motor on the storage device to allow it to come up to full speed (i.e., start-up latency), and how long to maintain power to the motor so as to transfer the desired amount of data (i.e., a wake-up period). The length of a wake-up period may depend on a number of factors, including, but not limited to, the high speed transfer rate, the size of the buffer 124, the type of CODEC 114, power consumption to start and run the storage device 126, error handling and data fragmentation.

The system 100 also may include an optional input/output (I/O) interface 130. The system 100 may include any conventional form of I/O interface and may typically include a serial interface and/or a universal serial bus (USB) interface. The operation of a serial interface and USB interface are well-known in the art and need not be described in greater detail herein. Although illustrated as a single I/O interface 130, those skilled in the art will recognize that the I/O interface 130 is intended to illustrate the function of one or more conventional interfaces.

A power supply 132 provides power to all of the components of the system 100. In an exemplary embodiment, the power supply 132 comprises two or more AAA batteries. A voltage regulator (not shown) in the power supply 132 provides a regulated voltage of approximately 3.1 VDC. The power supply 132 may also include provisions, such as an external power supply jack 170 (see FIG. 2), to permit the introduction of power from an external source, such as a cigarette lighter in an automobile, or the like.

The various components of the system 100 are coupled together by a bus system 134. The bus system 134 may include a data bus, control bus, the $I^2S$ bus, a memory bus, and the like. However, for the sake of simplicity, these various buses are illustrated in FIG. 1 as the bus system 134.

Figure 2:
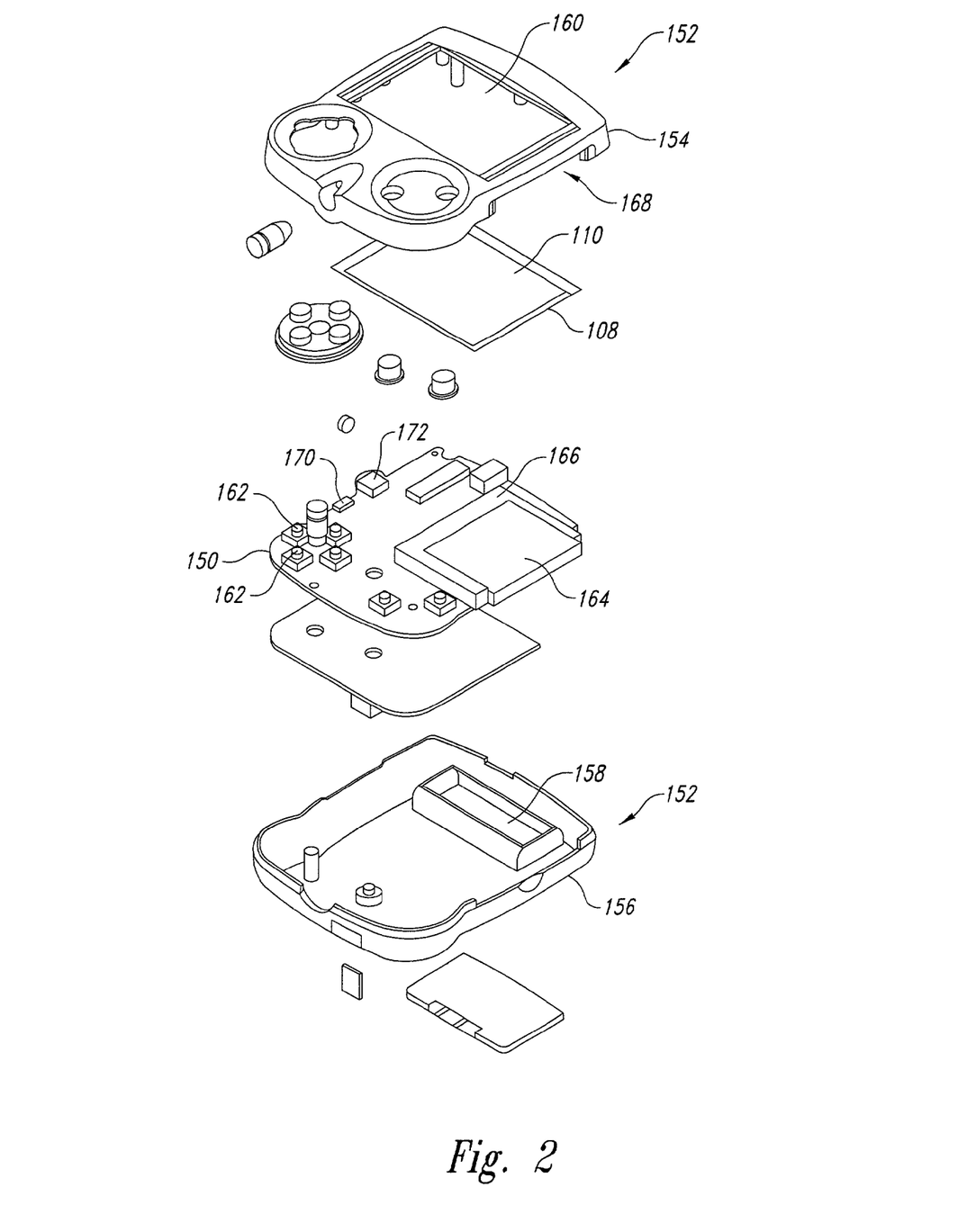
FIG. 2 is an exploded view of a device implementing the present invention.

The system 100 is intended for portable operation. The various components described above are typically implemented as one or more integrated circuits on a printed circuit (PC) board 150, as shown in FIG. 2. The PC board 150, power supply 132, display 108, input device 110, and other components of the system 100 are enclosed in a case or housing 152. The housing 152 is designed to be small enough to fit in a single hand of the user and thereby permit operation with the other hand of the user. The housing 152 may be readily manufactured in two pieces comprising an upper housing portion 154 and a lower housing portion 156. The lower housing portion has a battery compartment 158 sized to receive and retain two AAA batteries. The upper housing portion 154 contains an aperture 160 sized to receive and retain the display 108. In the embodiment illustrated in FIG. 2, the display 108 is combined with a touch-sensitive screen as a portion of the input device 110. In addition, the embodiment illustrated in FIG. 2 contains a plurality of electromechanical switches 162 that are also part of the functional block illustrated in FIG. 1 as the input device 110. In the embodiment illustrated in FIG. 2, four switches 162 may be positioned to form a "top hat" switch in which one or two of the four switches may be simultaneously activated to provide eight different switch combinations. FIG. 2 also illustrates a module 164 that may be inserted into a socket 166 mounted on the PC board 150. The upper housing portion 154 contains a slot 168 in the side portion to permit the insertion and removal of the module 164. In one embodiment, the module 164 may be a flash memory pack. Alternatively the module 164 may be a click-drive, such as manufactured by Iomega, that functions as the storage device 126.

In addition to the functional components illustrated in FIG. 1, the PC board 150 contains an external power supply jack 170 and an audio output jack 172. The external power supply jack 170 may be used to supplement the power provided by the AAA batteries. For example, the system may be used in an automobile or other vehicle by connecting a cigarette lighter adapter to the external power supply socket 170 to provide power directly from the vehicle. The audio output jack 172 is a conventional ⅛ inch stereo phone jack that is designed to receive a standard stereo mini-phone plug.

Figure 3:
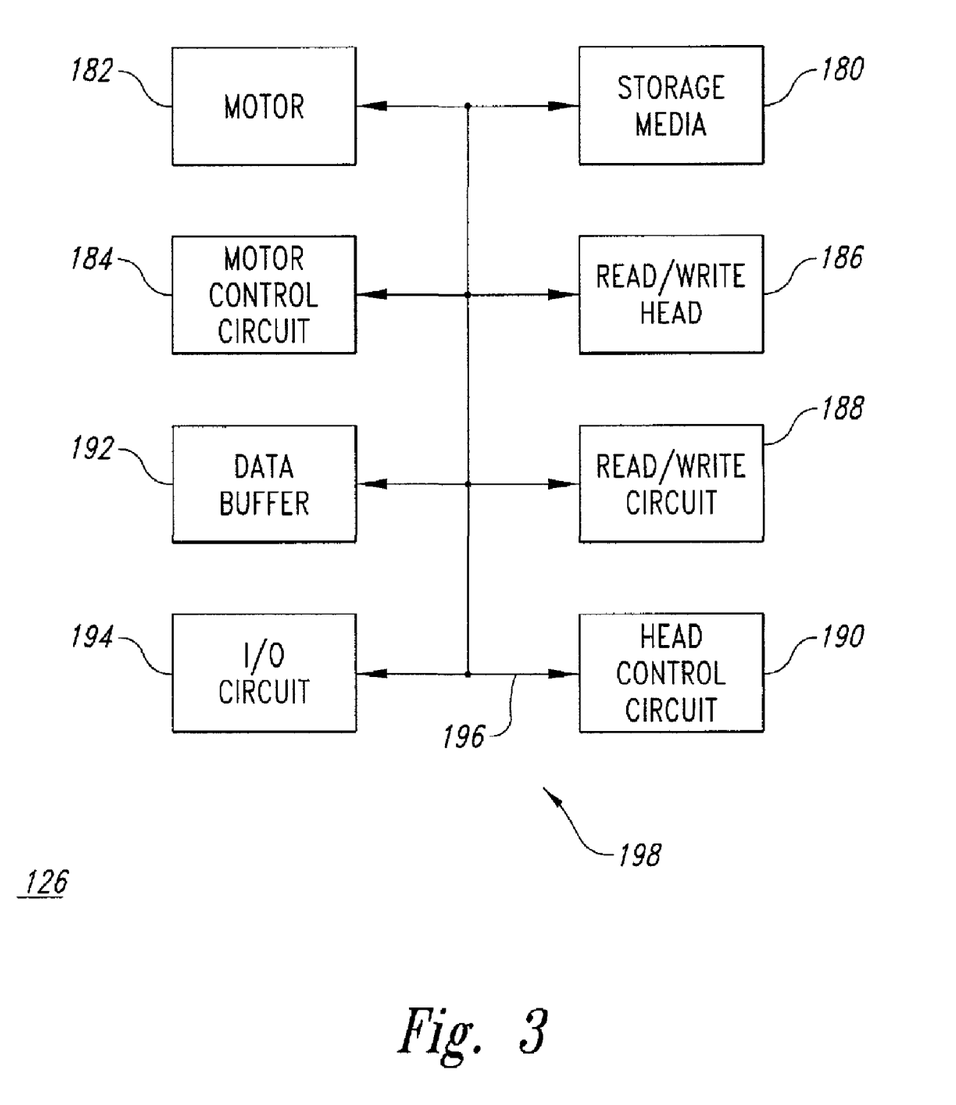
FIG. 3 is a functional block diagram of a data storage device used in the implementation of the present invention.

Returning again to FIG. 1, the storage device 126 is controlled by instructions stored in the memory 104 and executed by the CPU 102. The instructions serve to control the operation of the storage device 126. The storage device 126, which may be a CD-ROM, a micro-drive, a click drive, or the like, has a motor whose operation is controlled by the instructions from the CPU 102. FIG. 3 is a functional block diagram illustrating the components that comprise the storage device 126. The storage device 126 includes a storage media 180, such as a magnetic storage media or optical storage media. It should be noted that in some cases, the storage media 180 may be physically removed from the storage device 126, as in the case of a removable disk.

The storage device 126 comprises a motor 182 and motor controller 184. The motor 182 is a direct drive motor while the motor control circuit 184 controls the motor speed. Other conventional components, such as a read/write head 186, a read/write circuit 188, and a head control circuit 190, are also included in the storage device 126. The read/write head 186 contains a sensor, such as a magnetic sensor, to read and write data to and from the storage media 180. If the storage media 180 is an optical device, such as a CD-ROM, the read/write head 186 may be an optical device. If the storage media 180 is a read-only device, such as an optical CD-ROM, the read/write head 186 is replaced simply by a read head (not shown). The read/write circuit 188 contains conventional electronic circuitry to amplify the detected signal generated by the read/write head 186. The head control circuit 190 controls the position of the read/write head 186 and allows the read/write head to be positioned over the desired track on the storage media 180. The operation of the read/write head 186, read/write circuit 188 and head control circuit 190 are well-known in the art and need not be described in any greater detail herein.

In addition, the storage device 126 contains a data buffer 192 and an I/O circuit 194. The data buffer 192 temporarily stores data retrieved from the storage media 180 during a READ operation or stores data to be transferred to the storage media during a WRITE operation. The operation of the data buffer 192 is well-known and need not be described in any greater detail herein. The I/O circuit 194 is coupled to the bus system 134 (see FIG. 1) and controls the flow of data and command instructions between the storage device 126 and the CPU 102. The various portions of the storage device 126 may be coupled together by an internal bus system 196, which may comprise a power bus, data bus, control bus, or the like. For the sake of convenience, these busses are illustrated in FIG. 3 as the internal bus system 196. The storage device 126 is typically a commercial product, such as IDE hard drives or CD-ROMs from a number of different manufacturers, as well as microdrives and click-drives from companies, such as Microdrive, DataPlay, and Clik. The various components illustrated in FIG. 3, except for the storage media 180 itself, may be collectively referred to as a disk controller 198. As will be discussed in greater detail below, the disk controller receives data and commands from the CPU 102 to read and write data to the storage media 180. The BIOS portion of the memory 104 provides instructions to control access to a selected track and/or cylinder of the storage media 180.

The storage device 126 operates in a conventional manner to transfer data between the storage media 180 and the buffer 124. As those skilled in the art can appreciate, the motor 182 consumes a significant amount of power when active. Indeed, the motor 182 is the main source of power consumption in the system 100. Accordingly, the system 100 maintains the motor 182 in a deactivated state until a data transfer is required. As will be discussed below, the system 100 must determine when to start the motor 182 so as to read data at an appropriate time. This is particularly important in audio applications where it is undesirable to have a break in the audio output stream. The system 100 must determine ahead of time when data will be needed and start up the motor 182 in advance of the time when data will actually be needed so that data may be read from the storage media 180 and stored in the buffer 124 (see FIG. 1) for delivery to the CODEC 114.

In a conventional CD containing music, the digital data is uncompressed. The raw data file, sometimes referred to as a "Red Book Audio" file, consumes an extraordinary amount of storage space. In a conventional CD player, music is encoded at a sample rate of 44,100 Hertz per channel. A five minute sample of music would require more than 26 million samples (300 seconds times 44,100 samples per channel per second times 2 channels=26.46 million samples). A typical CODEC utilizes 16 bit stereo samples for a total of almost 53 million bytes of data (26.46 million samples times 2 bytes per sample) for a five minute selection of music. As can be appreciated, utilization of the Red Book Audio file requires significant storage capacity. However, many CODECs utilize a form of compression that greatly reduces the storage requirements. Although lossless compression may be possible, such compression is often limited in the overall reduction of storage requirements. For example, typical lossless compression may result in a 2:1 or 3:1 compression ratio. However, such lossless compression would still require 20-30 megabytes of storage for a five minute music sample. Other forms of compression do encounter some loss of information. However, such lossy compression has been satisfactorily implemented to eliminate portions of data samples that have little or no effect on the music heard by the user. MP3 compression is one such form of lossy compression. With MP3 format encoding, it is possible to achieve compression ratios of 10:1.

Although MP3 encoding is well-known in the art, the following brief description will assist in a better understanding of the present invention. MP3 systems process the Red Book Audio wave by dividing the acoustic signal into a series of wavelets or frames. Fourier transformation of the wavelets from the time domain to the frequency domain is applied and frequencies compared using predetermined masking rules to eliminate frequencies that humans cannot typically hear. In addition, frequencies whose energy levels fall below a certain decibel limit, such that they are inaudible to the typical human ear, are also removed. Furthermore, some CODECs check for redundant information between the two channels of a stereo signal to delete redundant information between the two channels. Following such a signal processing, MP3 uses Huffman encoding for each frame. Frame header information is prepended to the frame and the data stored in a file. This process is capable of achieving up to 10:1 compression ratio. The decoding process occurs in essentially the opposite order with Huffman decoding of the frequency data and an inverse Fourier transformation to return the frequency data to the time domain. Finally, specialized interpolations are performed between the data frames, in a process known as "windowing," to generate the desired output signal.

As noted above, MP3 transforms data into a series of frames. For proper operation, MP3 requires fixed frame size of 384 bytes per frame with a frame equal to approximately 44 milliseconds. When the system 100 calculates a quantity of data needed in step 220, the CPU 102 takes into account that the CODEC 114 (see FIG. 1) requires complete frames. Accordingly, if the system 100 is implemented using MP3 format, the data will be transferred in complete frames. This requires the transfer of data in multiples of 384 bytes (plus the prepended header) such that only complete frames are transferred. In contrast, other data formats, such as windows media format (sometimes referred to as WMA) uses a variable bit rate and allows frames to be repeated if there is little change from the previous data frame. For example, during a slowly changing musical passage, data frames may change very little. The WMA format allows a variable bit rate and allows data frames to be repeated thus providing greater efficiencies in utilization of data. With such formatting, the system 100 can transfer a variable number of data bits from the storage media 180 (see FIG. 3) to the CPU 102.

The system 100 utilizes a number of different buffering strategies in order to optimize data transfer from the storage device 126. As previously discussed, the system 100 can dynamically allocate a number of different buffers when a particular application is instantiated. For example, the number of buffers, size of each buffer, and the number of full buffers to maintain are all variables that can be specified at the time an application is initially executed. This allows the behavior of the system to be tailored to the individual CODECs and the specific timing and efficiency requirements of each CODEC as well as the access time and data transfer rates of the storage device 126. In addition, as will be discussed in greater detail below, the system will maintain data in buffers for some period of time after the data has been transferred to the CODEC 114 to permit quick response to user requests to "Rewind" in the middle of a song.

In one example, illustrated in FIGS. 4-9, a number of buffers have been allocated for the storage of a music file. As those skilled in the art can appreciate, the data stored in the buffers can be of many different types of format. Accordingly, the following description will generically refer to data because the principles can be applied to any format. For simplicity, assume that a megabyte of storage is available for the buffer 124. Further, the buffer 124 may be readily broken down into a number of individual buffers. In the example, illustrated in FIGS. 4-9, the buffer 124 has been subdivided into sixteen separate buffers. For convenience in illustrating the principles of the present invention, the buffers 1-16 are illustrated as contiguous buffers within the buffer 124. However, those skilled in the art will recognize that the buffers 1-16 need not be contiguous. Furthermore, the buffers 1-16 are illustrated in FIGS. 4-9 as being of a single size, namely 64 Kbytes (64 Kbytes×16=1 megabyte). Having contiguous buffers of a convenient constant size, such as 64 Kbytes, may simplify the programming process for operation of the system 100. However, those skilled in the art will recognize that the buffers 1-16 need not be contiguous, nor need they be of uniform size.

Figure 4:
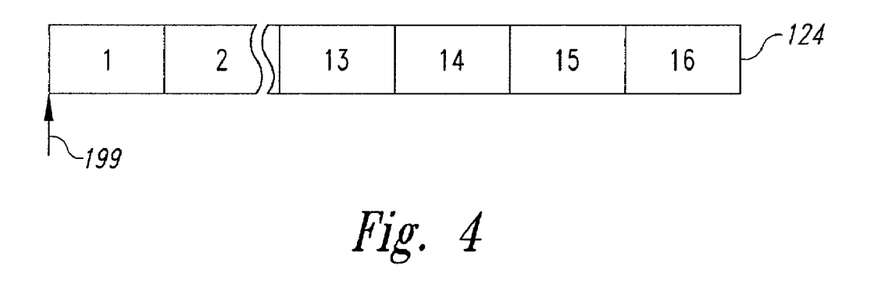
FIGS. 4-9 are diagrams illustrating various buffering techniques used by an implementation of the present invention.

When a particular music data file or track has been selected by the user, the system 100 will initially activate the storage device 126 to extract the data therefrom to fill the entire buffer 124. However, the system 100 need not wait until all 16 buffers are filled until music can be played via the CODEC 114 (see FIG. 1). For example, the system 100 can begin transferring data from the buffer 124 to the CODEC 114 as soon as buffer 1 is filled. Thus, buffers 2-16 will continue to receive data from the storage device while played out from the buffer 124 to the CODEC 114. As illustrated in FIG. 4, a pointer 199 indicates the current position within the buffer 124 where data is being read and transferred to the CODEC 114. The data pointer 199 is sometimes referred to as the "Read Point" for the buffer 124. As data is transferred from the buffer 124 to the CODEC 114, the read point 199 shifts to reflect the fact that data is being read out of the buffer 124.

Figure 5:
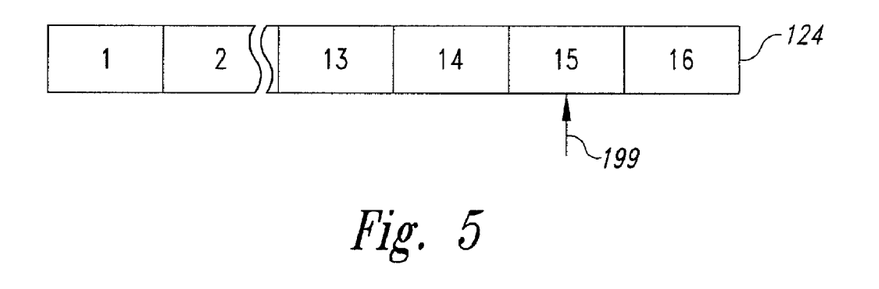

In normal operation, the read point 199 will shift sequentially through buffers 1-16 as the music track is played out via the CODEC 114. At some point in time, the read point 199 will approach the end of the buffer 124, which will require the transfer of additional data from the storage device 126. As previously noted, the decision of when to activate the storage device 126 depends on factors such as the type of data file being played (e.g., music versus speech), the time for the motor 182 (see FIG. 3) to reach the proper speed, the data transfer rate of the storage device 126, and the like. FIG. 5 illustrates the activation of the storage device 126 when the read point 199 reaches a predetermined location in buffer 15. For example, at a sample rate of 48,000 samples per second (time two channels), the buffer 124 must supply data to the CODEC 114 at the rate of 96,000 bytes per second. Accordingly, in the example illustrated in FIGS. 4-9 where each of the buffers 1-16 is 64 Kbytes in length, a single one of the buffers 1-16 provides approximately 0.68 seconds of data for the CODEC 114. The time for the motor 182 to reach full speed when power is applied and the data transfer rate from the storage device 126 to the buffer 124 can be readily determined. Thus, a simple calculation will provide the system with the location of the read point 199 when the storage device 126 must be activated to provide more data to the buffer 124.

In a conventional application, the entire buffer would be refilled with data from the storage device 126. However, in many applications, the user may wish to backup or "Rewind" the device. If all the buffers 1-16 were refilled with new data, a rewind request from the user would require reactivation of the storage device 126 and the rebuffering of data for all of the buffers 1-16. To avoid such non-optimal utilization of the storage device 126, the system 100 can reserve a portion of the buffer preceding the read point 199. For example, FIG. 5 illustrates the position of the read point 199 in buffer 15 when the storage device 126 must be activated to replenish the data from buffers 1-14. However, rather than replenish all data from buffers 1-14, the system 100 may reserve, by way of example, two buffers of data preceding the read point 199. In the example illustrated in FIG. 5, the storage device 126 is activated when the read point 199 reaches a predetermined location in buffer 15. The system 100 may read sufficient data from the storage device 126 to fill buffers 1-12 of the buffer 124. Thus, buffers 13-14 contain approximately 1.25 seconds of data. Alternatively, the system 100 may extract data from the storage device 126 to fill buffers 1-14 on the presumption that the read point 199 will be almost at the end of buffer 16 by the time buffers 1-14 are filled with data from the storage device 126. Those skilled in the art will recognize that the number of buffers reserved for a rewind operation can be altered depending on the application. Accordingly, the present invention is not limited by the specific number of buffers utilized for a rewind operation.

Figure 6:
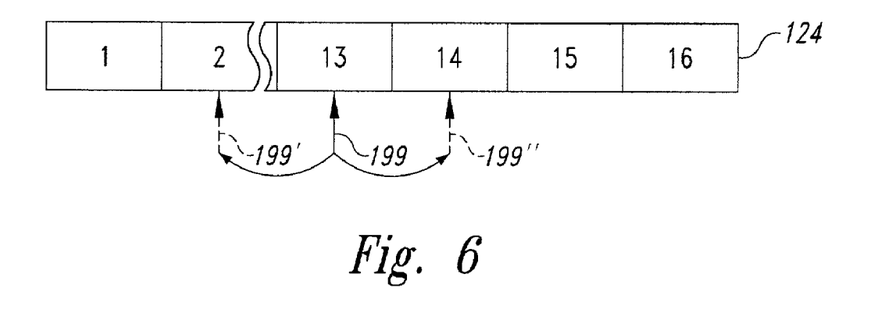

In addition, the sixteen buffers illustrated in the examples of FIGS. 4-9 provide efficient buffered seek operations, such as, by way of example, rewind and fast forward operations. FIG. 6 illustrates an example of a fast forward and rewind operation in which the user is moving the read point 199 within the range of the buffered data. As illustrated in FIG. 6, the current read point is in buffer 13. In one example, the user activates the input device 110 (see FIG. 1) to "Rewind" the musical track to a point within buffer 2. In this example, the read point is moved to the desired location within buffer 2 as illustrated by the reference numeral 199'. Because the read point 199' is still within the range of the buffer 124, there is no need to rebuffer the entire contents of the buffer 124 since the CODEC 114 (see FIG. 1) will simply replay buffers 2-13 again. Thus, the system 100 realizes greater efficiency in data transfers and avoids the unnecessary activation of the motor 182 (see FIG. 3).

In the other example illustrated in FIG. 6, the user activates the input device 110 (see FIG. 1) in a "Fast Forward" operation. In the example illustrated in FIG. 6, the user has activated the input device 110 to fast forward to a location within buffer 14. The new read point, indicated by the reference numeral 199", is now at the user-selected location within buffer 14. Again, it is unnecessary to reload the entire contents of the buffer 124 simply to accommodate the fast forward operation. However, those skilled in the art will appreciate that the fast forward operation moves the read point 199" closer to the point in time where the contents of the buffer 124 must be refilled, as illustrated with respect to FIG. 5. Furthermore, the user may select a fast forward operation that moves the read point 199" past the location at which the storage device 126 must be activated in order to refill the contents of the buffer 124. In that case, it will be necessary to activate the storage device 126 immediately so as to refill the buffer. However, the system 100 has still realized greater efficiency in buffering by activating the storage device 126 only when necessary to fill large portions of the buffer 124. Fast forward and rewind operations to points within the buffer do not necessarily require activation of the storage device 126.

Figure 7:
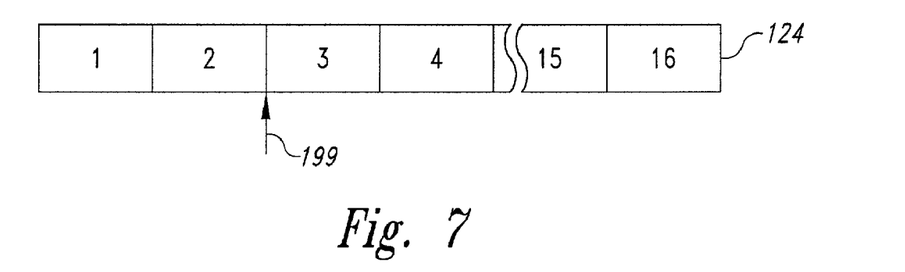

In other circumstances, the user may initially jump to a location in a musical track that is not at the beginning of the musical track. In that situation, the system 100 will activate the storage device 126 to fill the buffer 124 in the manner previously described. However, the system 100 may further allocate buffer space that precedes the user selected point in the musical track. This concept is illustrated in FIG. 7, where buffers 1-16 are filled with data but wherein the read point 199, which corresponds to the user-selected start point in the musical track, is set at the beginning of buffer 3. In this manner, buffers 1-2 contain data that will not be played unless the user activates the rewind operation, as discussed above. Rewind operations that move the read point to locations within buffers 1-2 are accomplished very quickly and do not require reactivation of the storage device 126. Fast forward operations are also accommodated in the manner described above. That is, fast forward operations that move the read point 199 to a location within the range of the buffer 124 are accomplished very quickly without activation of the storage device 126.

Figure 8:
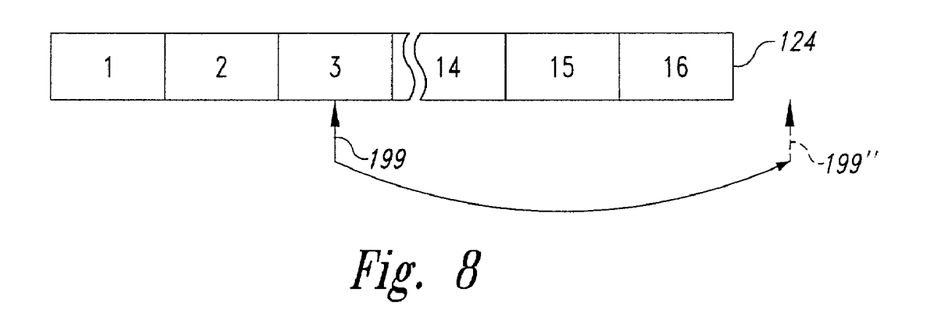

In other circumstances, the user may activate a fast forward operation to move the read point to a location beyond the range of the buffer 124. This is illustrated in FIG. 8 where the read point, indicated by the reference numeral 199", has been moved to a location beyond the range of buffer 16. If the new read point 199" is only slightly beyond the end of buffer 16, the system 100 can activate the storage device 126 to buffer ahead to the read point 199". This allows some of the already filled buffers to be maintained for possible use in a Rewind operation, as discussed above. However, the situation is limited by the latency of servicing the request (i.e., starting the motor 182, waiting for the motor 182 to reach operational speed, and transferring the data from the storage media 180).

If the new read point 199" is too far beyond the range of the buffer 124, none of the already filled buffers will be used in a Rewind operation. In this case, the system 100 will move the read pointer to the user selected location and fill the entire contents of the buffer in the manner illustrated in FIG. 7.

Figure 9:
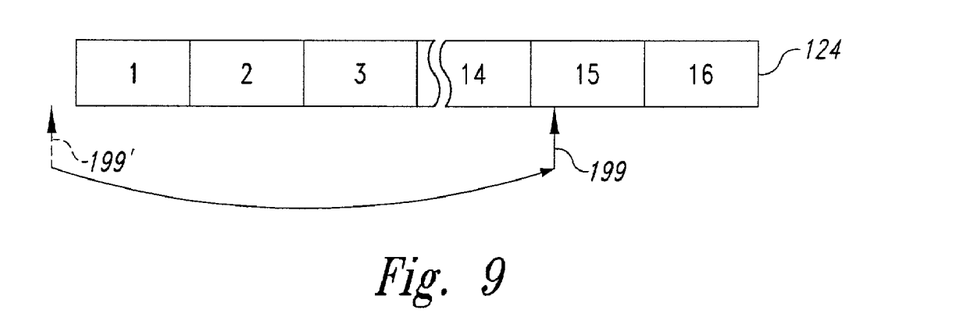

In other circumstances, the user may activate the input device 110 (see FIG. 1) to initiate a rewind operation that will move the read point 199 to a point prior in time to the range of the buffer 124. This is illustrated in FIG. 9 where the user-selected location of the read point, designated by the reference numeral 199', is earlier in time than the range of data contained in buffer 1. In this example, the system 100 activates the storage device 126 to "Backfill" data into the buffer 124. However, the system 100 need not load the entire contents of the buffer 124 to accommodate this request. FIG. 9 illustrates an example where the read point 199' is just before the range of buffer 1. In this example, the system 100 can backfill one or more buffers to provide data at least as far back as the new read point 199'. The system may provide additional buffering to accommodate future rewind requests by the user, as described above with respect to FIG. 7. However, the system 100 need not reload the entire contents of the buffer 124. In the example illustrated in FIG. 9, the read point 199 is moved from buffer 15 to a location just prior to the range of buffer 1. In one example, a single buffer of data (preceding buffer 1 in time) must be reloaded to accommodate the rewind requests from the user. However, the contents of buffers 1-15 (which may be relabeled as labels 2-16 for the sake of convenience) need not be reloaded since they will be transferred to the CODEC 114 (see FIG. 1) without having to reactivate the storage device 126.

In a further example to illustrate this concept, consider the total storage capacity of the buffer 124 as 1 megabyte and the user requests a location that is 600 Kbytes prior to the current range of the buffer 124. In this example, the storage device 126 (see FIG. 1) is activated to fill the 600 kilobytes of buffer space. However, the remaining 400 kilobytes of buffer space need not be reloaded since that data falls within the range of the buffer 124 and will be reused in the near future (barring possible additional rewind or fast forward operations.

Thus, the buffering techniques provided by the system 100 efficiently utilizes buffer space and minimizes operations that require the activation of the storage device 126.

Part of the efficiency provided by the buffering techniques of the system 100 is that only one buffer is "Locked" for a reading to the CODEC 114 while the other buffers are available for read/write operations. In the examples illustrated in FIGS. 4-9, sixteen buffers are allocated as part of the buffer 124. Thus, only 1/16 of the total buffer space is locked for data transfer to the CODEC 114 and is thus unavailable for other read/write operations. However, the remaining 15/16 of the total buffer space are available to be filled each time the storage device 126 is activated. Such operation is in sharp contrast to a typical buffering operation in which a buffer is allocated into two portions with only one-half of the buffer space available for read/write operations while the other half of the buffer space is locked for data transfer operations to the CODEC.

Figure 10:
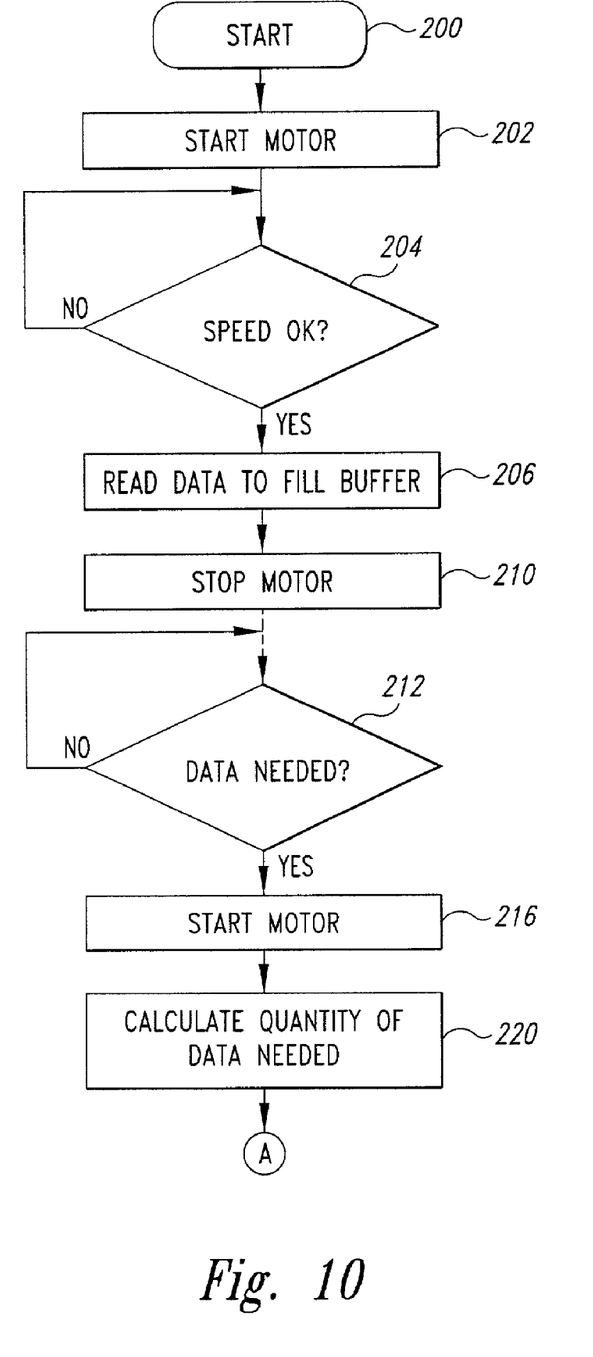
FIGS. 10 and 11 together form a flowchart illustrating the operation of the present invention.
Figure 11:
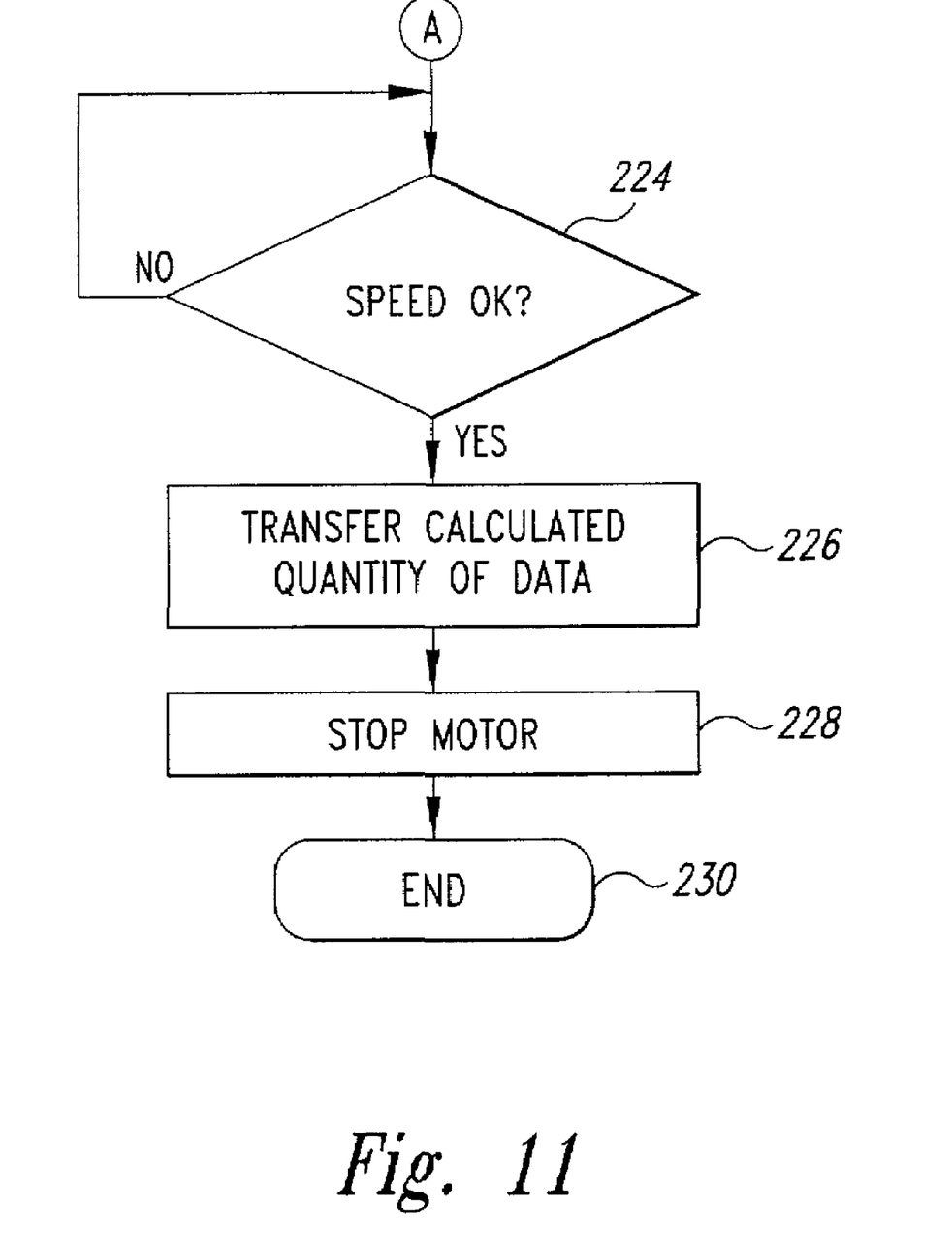

The process of reading data from the storage media is illustrated in flowchart of FIGS. 10 and 11 where, at a start 200, the system is already under power. For example, the user may have elected to play a music selection stored on the storage media 180. In step 202, the CPU 102 (see FIG. 1) sends commands to the storage device 126 to start the motor 182 (see FIG. 3). In decision 204, the motor control circuit 184 determines whether the motor speed is satisfactory. As those skilled in the art can appreciate, the motor takes a brief predetermined period of time to reach operating speed. This time can be readily determined and, as will be discussed below, is one factor used to determine when to start the motor to read additional data from the storage media 180. If the motor speed is not satisfactory, the result of decision 204 is NO and the system 100 returns to decision 204 until the motor has reached its operational speed. When the motor has reached its correct operational speed, the result of decision 204 is YES and in step 206, the disk controller 198 reads a sufficient amount of data to fill the buffer 124.

After sufficient data has been read from the storage media 180 to fill the buffer 124, the motor is stopped in step 210. As noted above, this significantly reduces the power consumption of the system 100 thereby significantly extending the life of the AAA batteries that comprise the power supply 132 (see FIG. 1).

There are a number of factors considered by the system 100 in determining when to start the motor again and read additional data from the storage media 180. Among these factors are the time it takes to start the motor and bring it up to normal operational speed, the size of the buffer 124 and the amount of available space in the buffer and the type of audio data being generated by the system. For example, music data is played at very high rates by the CODEC 114. Thus, the data in the buffer 124 is rapidly transferred to the CODEC 114. In contrast, speech data is provided to the CODEC 114 at a significantly lower data transfer rate. Accordingly, it is possible to wait until the buffer 124 is nearly empty before starting the motor 182 if the data being transferred to the CODEC is speech data. In contrast, the motor 182 must be started much earlier if the data being transferred to the CODEC 114 is music data.

In decision 212, the system 100 determines whether additional data is needed. As noted above, the system 100 takes many factors into account to determine precisely when data is needed. While this includes normal data transfer from the buffer 124 to the CODEC 114 (see FIG. 1), as illustrated in FIGS. 4 and 5, the process illustrated in decision 212 includes the various buffering strategies described above with respect to FIGS. 4-9. If data is not presently needed, the result of decision 212 is NO and the system 100 returns to decision 212 until additional data is needed. At a time when additional data is needed, the result of decision 212 is YES. In step 216, the CPU 102 (see FIG. 1) sends instructions to the disk controller 198 (see FIG. 3) to start the motor 182.

In step 220, the system 100 determines the quantity of data that will be required by the present disk transfer operation. It should be noted that step 220 may be executed after starting the motor 182 while waiting for the motor to reach proper operational speed. Alternatively, the calculation performed in step 220 may be done prior to starting the motor 182 or after the motor reaches operational speed. Those skilled in the art will appreciate that the quantity of data being transferred may vary depending on the point in time at which such calculation is made.

The quantity of data needed, which is calculated in step 220, takes into account the amount of space available in the buffer 124 (see FIG. 1), the type of CODEC 114, the type of drive (micro-drive versus click drive) and dynamically allocates buffers and buffer sizes. The system can allocate up to eight or more buffers to accommodate data transfers. For example, some drives are capable of transferring 512 K blocks of data. Under these circumstances, the system 100 will allocate sufficient number of buffers in the buffer 124 to accommodate the large block transfer size. Thus, the system 100 advantageously considers a number of variable factors in determining how much data to transfer and when such data transfers are required.

When the system has calculated the quantity of data required and started the motor (see step 216), the system moves to step 224, illustrated in FIG. 11 to determine whether the motor 182 (see FIG. 3) has reached the proper speed. If the motor 182 has not reached the proper speed, the result of decision 224 is NO and the system returns to decision 224 until the motor achieves the proper speed. When the motor 182 has reached the appropriate speed, the result of decision 224 is YES and, in step 226, the system 100 transfers the required amount of data from the storage media 180 to the buffer 124. In step 228, the CPU sends instructions to the disk controller 198 (see FIG. 3) to stop the motor 182. The data retrieval process ends at 230. At this point, the buffer 124 (see FIG. 1) has sufficient data such that the CODEC 114 receives a stream of data for conversion to analog form. The processing steps performed by the CODEC 114 to convert data stored in the buffer 124 is known in the art, and need not be described in greater detail herein. As noted above, different forms of CODECs are known in the industry and may be satisfactorily substituted into the system 100. That is, the CODEC 114 may be selected for speech production, music production, or a combination of the two. The specific algorithms used by the CODEC are known in the art and need not be described herein.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A portable media player comprising:
   a processor that executes commands;
   a random-access-memory component that stores compressed data in more than two different random-access-memory buffer areas, each random-access-memory buffer lockable and unlockable by the processor;
   a codec component, controlled by the processor, that reads compressed data from a locked random-access-memory buffer, the locked random-access-memory buffer selected from among the more than two different random-access-memory buffer areas and locked by the processor to prevent writing of the locked random-access-memory buffer by another component, and that generates a decompressed signal from the read compressed data that is rendered by a data-rendering component;
   a non-volatile, mass-storage component that stores compressed data and that writes compressed data, under control of the processor, to unlocked random-access-memory buffers; and
   a battery power supply to provide electrical power to the processor, random-access memory component, codec component, data-rendering component, and non-volatile, mass-storage component.

2. The portable media player of claim 1 wherein the processor continuously monitors progress of the codec component in decompressing data in order to:
   power up the non-volatile, mass-storage component;
   direct the non-volatile, mass-storage component to write additional compressed data to multiple random-access-memory buffers and redirect the codec component to read the additional compressed data from the multiple random-access-memory buffers so that the codec component can continue to generate a decompressed signal without interruption; and
   power-down the non-volatile, mass-storage component.

3. The portable media player of claim 2 wherein the processor, following reception of a fast-forward command that redirects rendering, by the data-rendering component, of compressed data starting at a desired location within a compressed-data sequence not currently stored within the more than two different random-access-memory buffer areas, directs the non-volatile, mass-storage component to write compressed data, starting at a location prior to the desired location in the compressed-data stream and ending at a location following the desired location in the compressed-data stream, to multiple random-access-memory buffers.

4. The portable media player of claim 2 wherein the processor, following reception of a rewind command that redirects rendering, by the data-rendering component, of compressed data starting at a desired location within a compressed-data sequence not currently stored within the more than two different random-access-memory buffer areas, directs the non-volatile, mass-storage component to write compressed data, starting at a location prior to the desired location in the compressed-data stream and ending at a location following the desired location in the compressed-data stream, to multiple random-access-memory buffers.

5. The portable media player of claim 2 wherein the processor, following reception of a rewind command that redirects rendering, by the data-rendering component, of compressed data starting at a desired location within a compressed-data sequence not currently stored within the more than two different random-access-memory buffer areas, directs the non-volatile, mass-storage component to write compressed data, starting at a location prior to the desired location in the compressed-data stream and ending at a location at which subsequent compressed-data of the compressed-data sequence is already stored in the more than two different random-access-memory buffer areas, to multiple random-access-memory buffers.

6. The portable media player of claim 2 wherein the processor, following reception of a fast-forward command, predicts portions of a compressed-data sequence that are likely to be accessed by additional fast-forward commands and directs the non-volatile, mass-storage component to write predicted portions of the compressed data to multiple random-access-memory buffers.

7. The portable media player of claim 2 wherein the processor minimizes the number of times that the processor powers up the non-volatile, mass-storage component.

8. The portable media player of claim 2 wherein the processor minimizes the duration of time during which the non-volatile, mass-storage component is powered up.

9. The portable media player of claim 2 wherein the processor locks only a single random-access-memory buffer at any point in time.

10. The portable media player of claim 2 wherein
the compressed data is a compressed audio signal; and
the decompressed signal is a decompressed audio signal.

* * * * *